(12) United States Patent
Kim et al.

(10) Patent No.: US 9,653,911 B1
(45) Date of Patent: May 16, 2017

(54) BROADBAND SURGE SUPPRESSION MODULE HAVING OPTICAL COUPLING CHANNEL

(71) Applicant: ELECTRONICS AND TELECOMMUNICATIONS RESEARCH INSTITUTE, Daejeon (KR)

(72) Inventors: Uijung Kim, Daejeon (KR); Kyung-Hoon Lee, Daejeon (KR); Sung-Hyun Kim, Daejeon (KR); Hoon Lee, Hwaseong-si (KR); Ki-Baek Kim, Daejeon (KR); Dong-Min Kim, Daejeon (KR); Sang-Kyu Kim, Daejeon (KR); Saehoon Ju, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/168,417

(22) Filed: May 31, 2016

(30) Foreign Application Priority Data

Dec. 1, 2015 (KR) .......................... 10-2015-0170177

(51) Int. Cl.
H05B 37/00 (2006.01)
H05B 41/00 (2006.01)
H02H 9/00 (2006.01)

(52) U.S. Cl.
CPC ............. *H02H 9/005* (2013.01); *H05B 37/00* (2013.01)

(58) Field of Classification Search
None
See application file for complete search history.

(56) References Cited

U.S. PATENT DOCUMENTS

| 5,570,263 A | * | 10/1996 | Dion | ................... | H04B 10/802 |
| | | | | | 361/119 |
| 2005/0063126 A1 | | 3/2005 | Joo | | |
| 2006/0262478 A1 | * | 11/2006 | Chaudhry | ............. | H04M 1/745 |
| | | | | | 361/119 |

FOREIGN PATENT DOCUMENTS

| KR | 10-2005-0029078 A | 3/2005 |
| KR | 10-2015-0058684 A | 5/2015 |

* cited by examiner

*Primary Examiner* — Anh Tran
(74) *Attorney, Agent, or Firm* — LRK Patent Law Firm

(57) ABSTRACT

A broadband surge suppression module having an optical coupling channel includes a surge protection circuit unit for eliminating or limiting a surge signal from an input digital signal, a light-emitting circuit unit for receiving an output signal of the surge protection circuit unit, converting the output signal into an optical signal, and transmitting the optical signal, a light-receiving circuit unit for receiving the optical signal from the light-emitting circuit unit, a signal restoration circuit unit for restoring a digital signal from an output signal of the light-receiving circuit unit, and a module casing unit for allowing the surge protection circuit unit, the light-emitting circuit unit, the light-receiving circuit unit, and the signal restoration circuit unit to be located therein, the module casing unit being formed to penetrate through an electromagnetic shielding wall for protecting a control system.

20 Claims, 20 Drawing Sheets

BROADBAND SURGE SUPPRESSION MODULE HAVING OPTICAL COUPLING CHANNEL

CROSS REFERENCE TO RELATED APPLICATION

This application claims the benefit of Korean Patent Application No. 10-2015-0170177, filed Dec. 1, 2015, which is hereby incorporated by reference in its entirety into this application.

BACKGROUND OF THE INVENTION

1. Technical Field

The present invention generally relates to a broadband surge suppression module having an optical coupling channel and, more particularly, to a broadband surge suppression module having an optical coupling channel, which can suppress high-power surges flowing into a control system through a digital signal line of the control system, which requires the connection of a conductive line, using an optical coupling channel.

2. Description of the Related Art

In control systems for electrical and industrial facilities, the connection of a large number of lines to transfer various control signals is required. For example, in the case of power network control systems, the connection of power lines for system operation, signal lines required to monitor the status of power control equipment, such as a power circuit breaker or a disconnecting switch, and control lines required to transmit/receive control signals is required. Depending on the function or type of equipment, a large number of signal lines/control lines may be used. As all lines connected to a control system, conductive transmission lines are used for the delivery of power and signals. Such a line may function as a path for transferring an external high-power surge to the inside of the control system.

When the strength of a surge transferred into the control system is higher than the withstand voltage of an internal electronic circuit, the malfunctioning or physical breakdown of the control system may occur, and thus surge suppression devices (or surge protection devices) suitable for the characteristics of respective lines must be added in order to protect the system against a conductive surge.

Generally, a surge suppression device for conductive paths is called a filter, and the basic function thereof is the function of a frequency selector for removing unwanted frequency components from a signal transferred through a line. A filter is a circuit that combines an inductor and a capacitor, and is categorized as a low-pass filter or a high-pass filter depending on which frequencies pass through the filter. In a filter for suppressing high-power surges, a filter circuit and a separate surge protection device (SPD) may occasionally be installed together. The SPD connected to the inside or input terminal of the filter circuit induces a high-power surge signal to flow through a ground line when the high-power surge signal is applied, thus preventing the surge signal from being applied to the input terminal of the filter circuit.

The rated specification of the inductor and the capacitor constituting a filter circuit is determined by the strengths of signals applied to the line. Since a part having a large volume and a high rated value must be used to manufacture a filter capable of accommodating a high rated value, the volume of the manufactured filter increases. In particular, due to the use of an inductor, in which an iron core is used, the volume of the filter inevitably increases according to the rated specification, thus imposing a limitation on manufacture at a small size. In particular, in a high-power surge suppression filter, a separate high-power surge protection device is installed together with a filter circuit, and thus there is a disadvantage with regard to the implementation of a filter having a small volume.

In order to protect the control system against high-power electromagnetic interference, the system to be protected must be installed in an electromagnetically shielded space, and transmission lines to be connected to the corresponding system are installed to penetrate through an electromagnetic shielding wall. Generally, conductive lines connected to a system installed in an electromagnetically shielded space are connected to the inside of the electromagnetically shielded space through a suitable filter, and a high-power surge suppression filter is installed such that it is electrically connected to the electromagnetic shielding wall.

For example, when the corresponding system is installed in an electromagnetically shielded space to protect a power network control system, multiple lines must be installed such that they penetrate through the electromagnetic shielding wall. The power network control system requires the connection of power lines, signal lines, and control lines, and also requires the connection of several tens or more of signal lines and control lines for respective pieces of equipment. In this way, to install filters for the connection of a large number of lines, a very large space is required for the installation of the filters.

When multiple filters are installed on a shielding wall, the electromagnetic shielding performance of the shielding wall may be deteriorated due to the formation of multiple holes through the shielding wall, and moreover, the prices of commercial filter products are as high as several hundreds Dollars or more, thus adding to the expense of the control system.

In relation to this, Korean Patent Application Publication No. 2005-0029078 discloses technology entitled "Surge Cancel Apparatus".

SUMMARY OF THE INVENTION

Accordingly, the present invention has been made keeping in mind the above problems occurring in the prior art, and an object of the present invention is to protect a control system requiring the connection of a large number of conductive lines from high-power electromagnetic interference. More specifically, the present invention is intended to prevent high-power surges from flowing into a control system through digital signal lines of the control system, which requires the connection of conductive lines, using an optical coupling channel.

Another object of the present invention is to implement a surge suppression module having a small size. A further object of the present invention is to reduce the space required to install multiple filters and to enable a larger number of transmission lines to be connected in the same space.

Additional object of the present invention is to very effectively suppress broadband surge signals and manufacture the surge suppression module so as to be detachably mounted to a shielding wall, thus facilitating the maintenance of the present invention.

In accordance with an aspect of the present invention to accomplish the above objects, there is provided a broadband surge suppression module having an optical coupling channel, including a surge protection circuit unit for eliminating or limiting a surge signal from an input digital signal; a light-emitting circuit unit for receiving an output signal of the surge protection circuit unit, converting the output signal into an optical signal, and transmitting the optical signal; a light-receiving circuit unit for receiving the optical signal from the light-emitting circuit unit; a signal restoration circuit unit for restoring a digital signal from an output signal of the light-receiving circuit unit; and a module casing unit for allowing the surge protection circuit unit, the light-emitting circuit unit, the light-receiving circuit unit, and the signal restoration circuit unit to be located therein, the module casing unit being formed to penetrate through an electromagnetic shielding wall for protecting a control system.

The module casing unit may include an inner conductive partition unit formed between the light-emitting circuit unit and the light-receiving circuit unit.

The optical signal transmitted from the light-emitting circuit unit may be transferred to the light-receiving circuit unit through an optical cable that is located on a partition-penetrating waveguide formed to penetrate through the inner conductive partition unit.

The optical signal transmitted from the light-emitting circuit unit may be transferred to the light-receiving circuit unit through a partition hole formed through the inner conductive partition unit.

The light-emitting circuit unit may be formed to be in close contact with a first side of the inner conductive partition unit, and the light-receiving circuit unit may be formed to be in close contact with a second side of the inner conductive partition unit.

The inner conductive partition unit may be formed to be located on an extension of the electromagnetic shielding wall, with the module casing unit mounted to the electromagnetic shielding wall.

The module casing unit may be formed to be detachably mounted to the electromagnetic shielding wall.

The module casing unit may be formed to be detachably mounted to a penetrating waveguide formed to penetrate through the electromagnetic shielding wall.

The signal restoration circuit unit may be supplied with DC power from a DC power source to restore a digital signal from the optical signal.

The module casing unit may be configured such that a mark is formed on a surface of an input stage or an output stage.

The module casing unit may be formed in a cylindrical shape.

In accordance with another aspect of the present invention to accomplish the above objects, there is provided a broadband surge suppression module having an optical coupling channel, including a module casing unit located to penetrate through an electromagnetic shielding wall for protecting a control system; a surge protection circuit unit located in the module casing unit and configured to eliminate or limit a surge signal from an input signal; an optical coupling channel unit located in the module casing unit and configured to receive an output signal of the surge protection circuit unit and transmit the output signal from an input stage to an output stage of the module casing unit through an optical coupling channel; and a signal restoration circuit unit located in the module casing unit and configured to restore a digital signal from an output signal of the optical coupling channel unit.

The optical coupling channel unit may include a light-emitting circuit unit for receiving the output signal of the surge protection circuit unit, converting the output signal into an optical signal, and transmitting the optical signal, and a light-receiving circuit unit for receiving the optical signal from the light-emitting circuit unit.

The module casing unit may include an inner conductive partition unit formed between the light-emitting circuit unit and the light-receiving circuit unit.

The optical signal transmitted from the light-emitting circuit unit may be transferred to the light-receiving circuit unit through an optical cable that is located on a partition-penetrating waveguide formed to penetrate through the inner conductive partition unit.

The optical signal transmitted from the light-emitting circuit unit may be transferred to the light-receiving circuit unit through a partition hole formed through the inner conductive partition unit.

The module casing unit may be formed to be detachably mounted to the electromagnetic shielding wall.

The module casing unit may be configured such that a mark is formed on a surface of the input stage or the output stage.

In accordance with a further aspect of the present invention to accomplish the above objects, there is provided a broadband surge suppression module having an optical coupling channel, including a module housing configured to include multiple broadband surge suppressors therein and formed in a portion of an electromagnetic shielding wall for protecting a control system, wherein each of the multiple broadband surge suppressors comprises a surge protection circuit unit for eliminating or limiting a surge signal from an input digital signal; a light-emitting circuit unit for receiving an output signal of the surge protection circuit unit, converting the output signal into an optical signal, and transmitting the optical signal; a light-receiving circuit unit for receiving the optical signal from the light-emitting circuit unit; a signal restoration circuit unit for restoring a digital signal from an output signal of the light-receiving circuit unit; and a module casing unit for allowing the surge protection circuit unit, the light-emitting circuit unit, the light-receiving circuit unit, and the signal restoration circuit unit to be located therein, the module casing unit being located to penetrate through a housing shielding wall in the module housing, which is located on an extension of the electromagnetic shielding wall.

The module casing unit may include an inner conductive partition unit formed between the light-emitting circuit unit and the light-receiving circuit unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
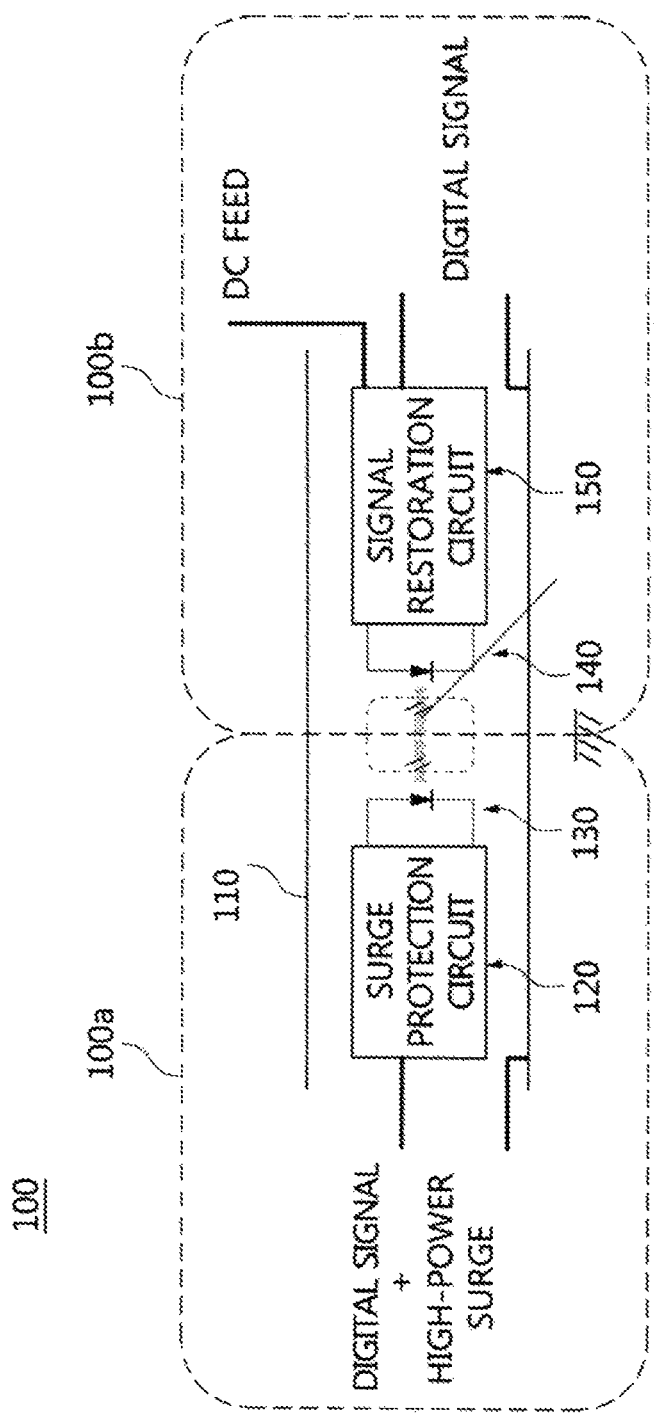
FIG. 1 is a diagram showing the configuration of the internal circuit of a broadband surge suppression module having an optical coupling channel according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, the configuration and operation of a broadband surge suppression module having an optical coupling channel according to an embodiment of the present invention will be described in detail with reference to the attached drawings.

Figure 2:
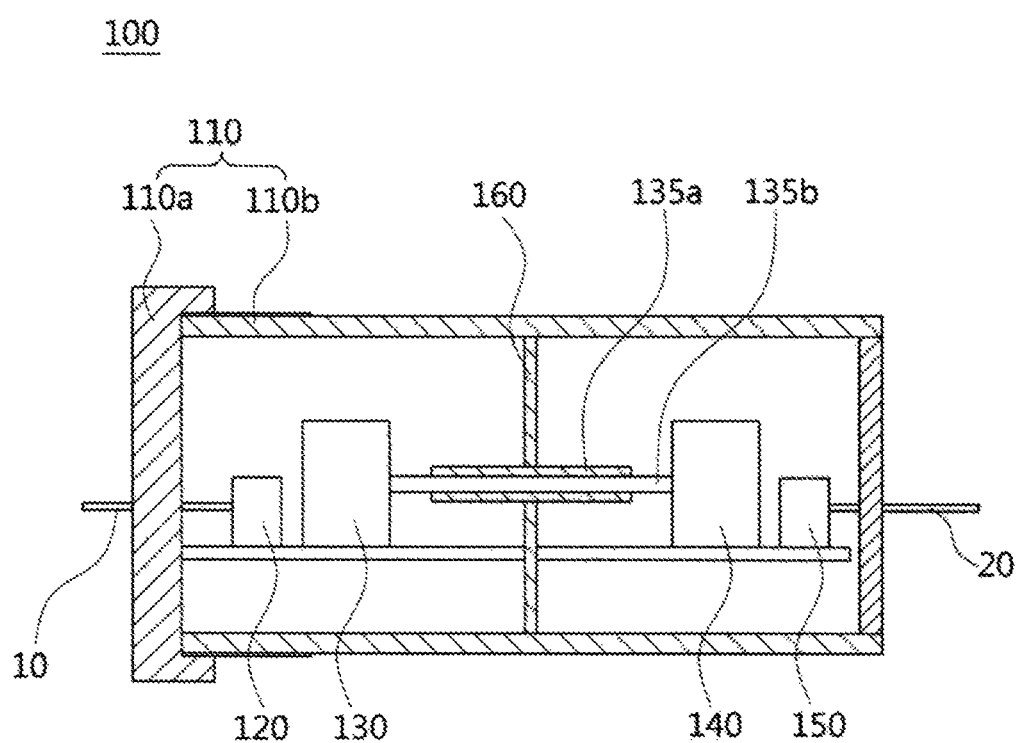
FIG. 2 is an internal sectional view of a broadband surge suppression module having an optical coupling channel according to an embodiment of the present invention.
Figure 3:
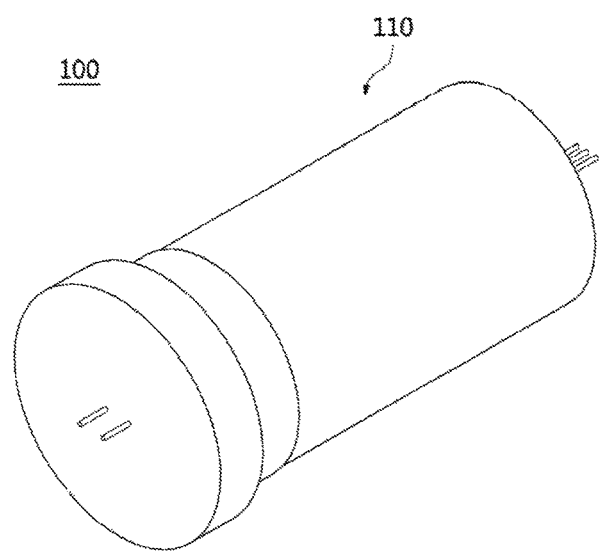
FIG. 3 is a perspective view of a broadband surge suppression module having an optical coupling channel according to an embodiment of the present invention.

FIG. 1 is a diagram showing the configuration of the internal circuit of a broadband surge suppression module having an optical coupling channel according to an embodiment of the present invention. FIG. 2 is an internal sectional view of a broadband surge suppression module having an optical coupling channel according to an embodiment of the present invention. FIG. 3 is a perspective view of a broadband surge suppression module having an optical coupling channel according to an embodiment of the present invention.

Referring to FIGS. 1 to 3, a broadband surge suppression module 100 having an optical coupling channel according to an embodiment of the present invention may be located in a portion of the electromagnetic shielding wall of a control system, and is configured to receive a digital signal through an input unit 100a from the outside of the electromagnetic shielding wall, internally transfer the digital signal through the optical coupling channel, re-convert the digital signal, and transfer the resulting digital signal to the control system inside the electromagnetic shielding wall through an output unit 100b.

More specifically, the broadband surge suppression module 100 having an optical coupling channel according to the embodiment of the present invention may be formed to include a module casing unit 110, a surge protection circuit unit 120, a light-emitting circuit unit 130, a light-receiving circuit unit 140, a signal restoration circuit unit 150, and an inner conductive partition unit 160.

The module casing unit 110 is a casing in which the surge protection circuit unit 120, the light-emitting circuit unit 130, the light-receiving circuit unit 140, the signal restoration circuit unit 150, and the inner conductive partition unit 160, which will be described later, are located. The module casing unit 110 may be formed to include a module cover 110a and a module enclosure 110b. Further, the module casing unit 110 may be located to penetrate through the electromagnetic shielding wall for protecting the control system. Furthermore, the module casing unit 110 is formed to be detachably mounted to the electromagnetic shielding wall. A detachable mounting scheme will be described in detail later with reference to FIGS. 5 to 11. In addition, the module casing unit 110 may be formed in a cylindrical shape.

The surge protection circuit unit 120 eliminates or limits a surge signal from the digital signal input through an input signal line 10.

The light-emitting circuit unit 130 receives the output signal of the surge protection circuit unit 120, converts the output signal into an optical signal, and transmits the optical signal.

The light-receiving circuit unit 140 receives the optical signal from the light-emitting circuit unit 130. The light-emitting circuit unit 130 and the light-receiving circuit unit 140 form an optical coupling channel, and are configured to receive the output signal of the surge protection circuit unit 120 and transmit the output signal from the internal input stage of the module casing unit 110 to the output stage thereof. Here, the optical signal transmitted from the light-emitting circuit unit 130 may be transferred to the light-receiving circuit unit 140 through an optical cable 135b disposed in a partition-penetrating waveguide 135a formed to penetrate through the inner conductive partition unit 160, which will be described later.

The signal restoration circuit unit 150 restores the digital signal from the output signal of the light-receiving circuit unit 140 and outputs the digital signal through the output signal line 20. Here, the output signal line 20 is connected to the control system provided inside the electromagnetic shielding wall. Such a signal restoration circuit unit 150 is supplied with Direct Current (DC) power from a DC power source to restore the digital signal from the optical signal. That is, a DC feed line may be additionally connected to the signal restoration circuit unit 150.

The inner conductive partition unit 160 is formed between the light-emitting circuit unit 130 and the light-receiving circuit unit 140 in the module casing unit 110. Such an inner conductive partition unit 160 may be formed to be located on an extension of the electromagnetic shielding wall, with the module casing unit 110 mounted to the electromagnetic shielding wall.

Hereinafter, the configuration and operation of a broadband surge suppression module having an optical coupling channel according to another embodiment of the present invention will be described with reference to the attached drawings.

Figure 4:
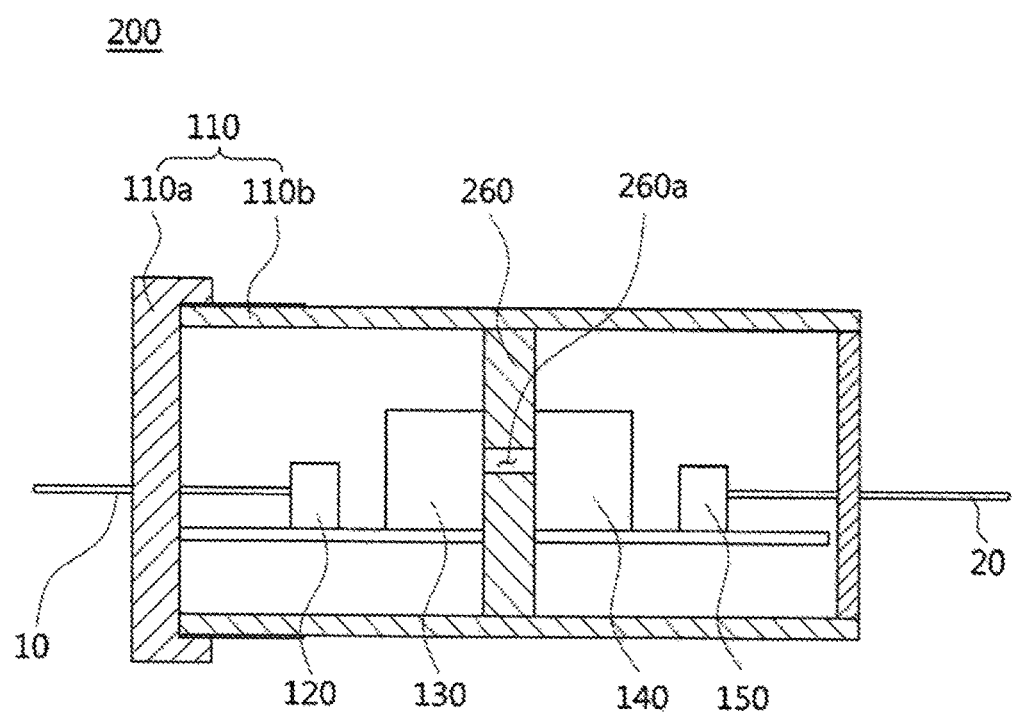
FIG. 4 is an internal sectional view of a broadband surge suppression module having an optical coupling channel according to another embodiment of the present invention.

FIG. 4 is an internal sectional view of a broadband surge suppression module having an optical coupling channel according to another embodiment of the present invention.

Referring to FIG. 4, a broadband surge suppression module 200 having an optical coupling channel according to another embodiment of the present invention is configured such that the configuration of only the optical coupling channel is different from that of the broadband surge suppression module 100 shown in FIGS. 1 to 3. Therefore, only the configuration of the optical coupling channel is described, and the same reference numerals are used to designate the same components as those of the broadband surge suppression module 100 of FIGS. 1 to 3, and thus a detailed description thereof will be omitted.

In the broadband surge suppression module 200 having an optical coupling channel according to another embodiment of the present invention, the optical coupling channel is formed to include a partition hole 260a, which is formed through an inner conductive partition unit 260. That is, an optical signal transmitted from the light-emitting circuit unit 130 is transferred to the light-receiving circuit unit 140 through the partition hole 260a in the inner conductive partition unit 260. Here, the light-emitting circuit unit 130 may be formed to be in close contact with a first side of the inner conductive partition unit 260, and the light-receiving circuit unit 140 may be formed to be in close contact with a second side of the inner conductive partition unit 260. By means of this structure, the broadband surge suppression module 200 having an optical coupling channel according to the other embodiment of the present invention may be implemented to have a smaller size.

Below, a detachable mounting scheme for attaching/detaching the broadband surge suppression module having an optical coupling channel according to the embodiment of the present invention to/from the electromagnetic shielding wall will be described.

Figure 5:
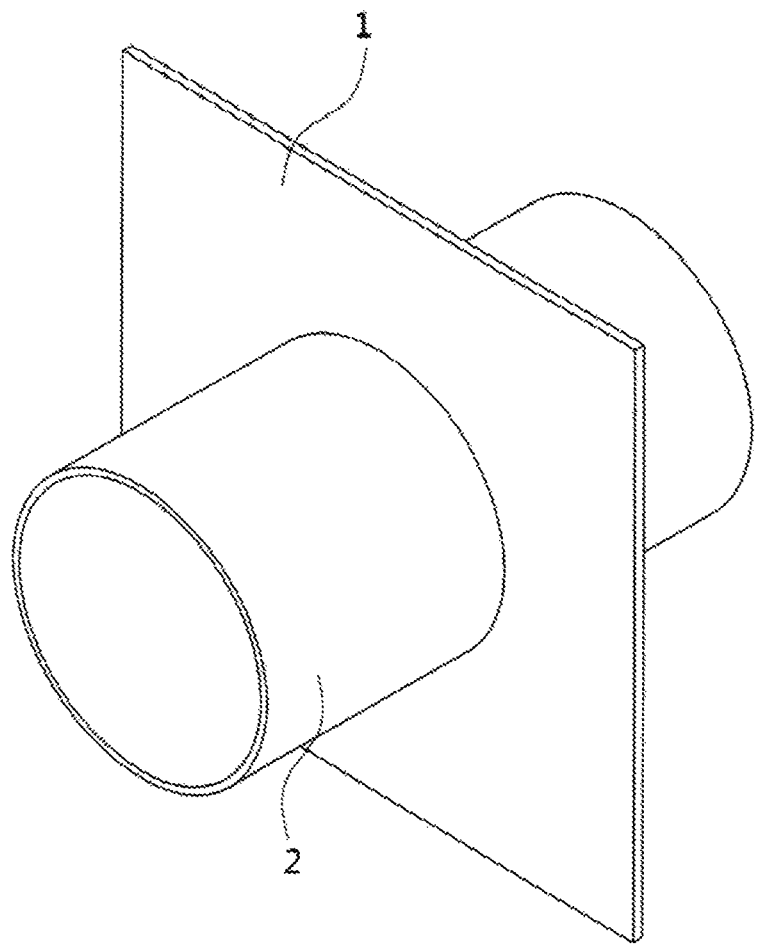
FIGS. 5 and 6 are diagrams showing the structure of an electromagnetic shielding wall and a penetrating waveguide on which the broadband surge suppression module having an optical coupling channel according to the embodiment of the present invention is installed.
Figure 6:
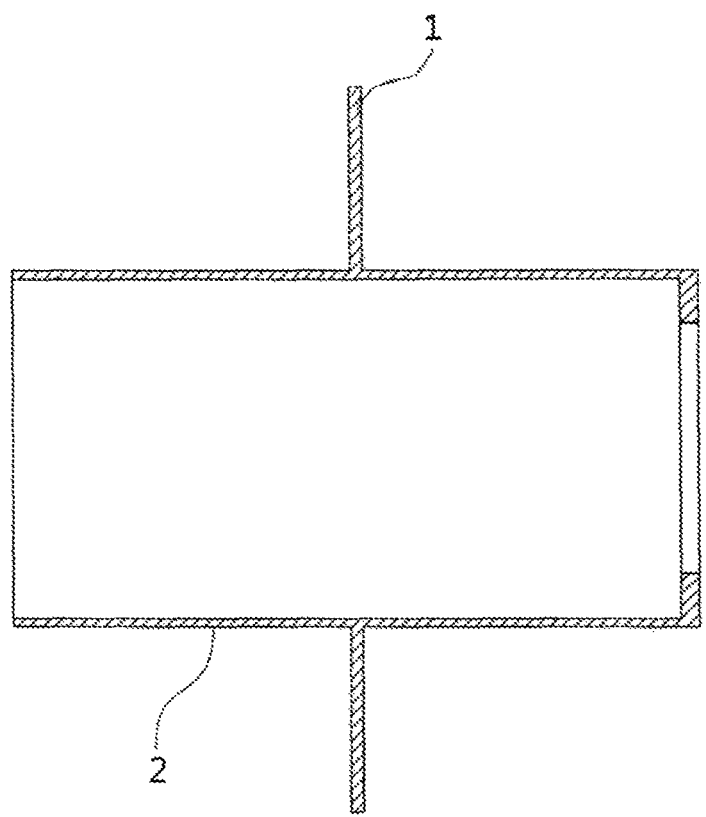
Figure 7:
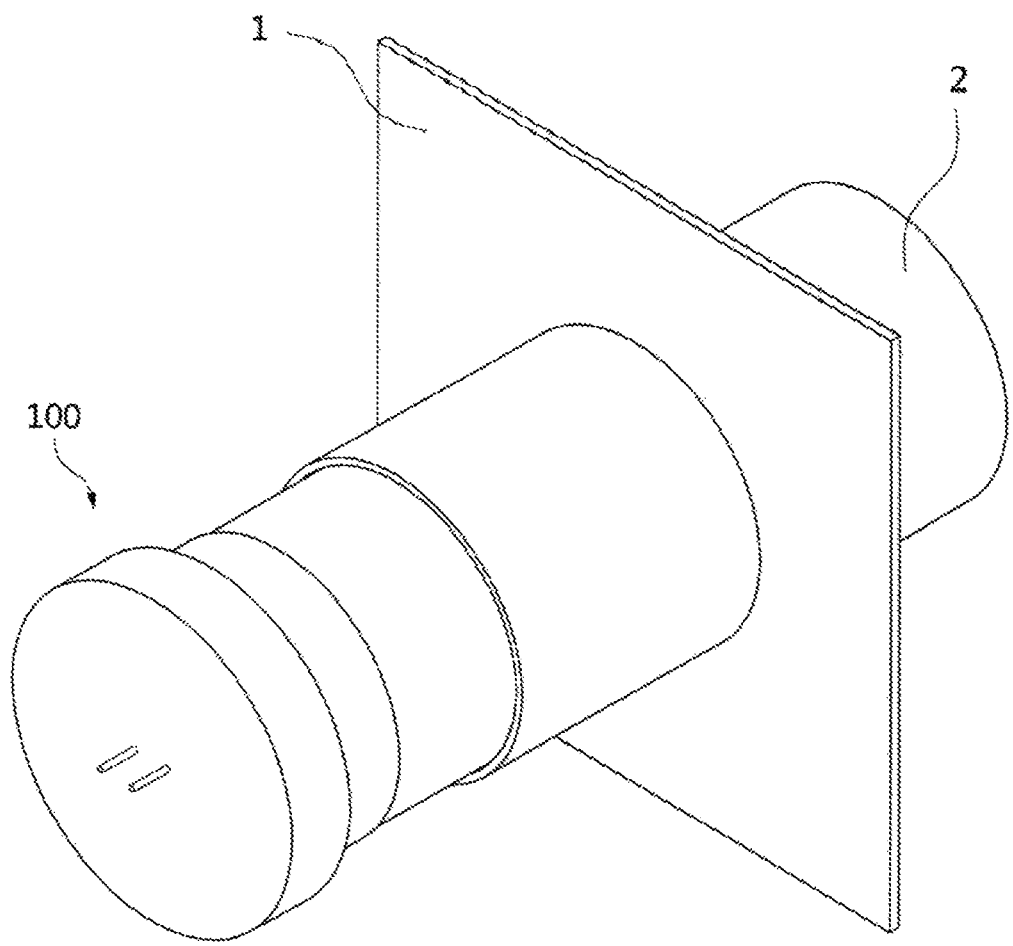
FIGS. 7 to 9 are diagrams showing a method for mounting the broadband surge suppression module having an optical coupling channel according to the embodiment of the present invention to the penetrating waveguide of FIGS. 5 and 6.
Figure 8:
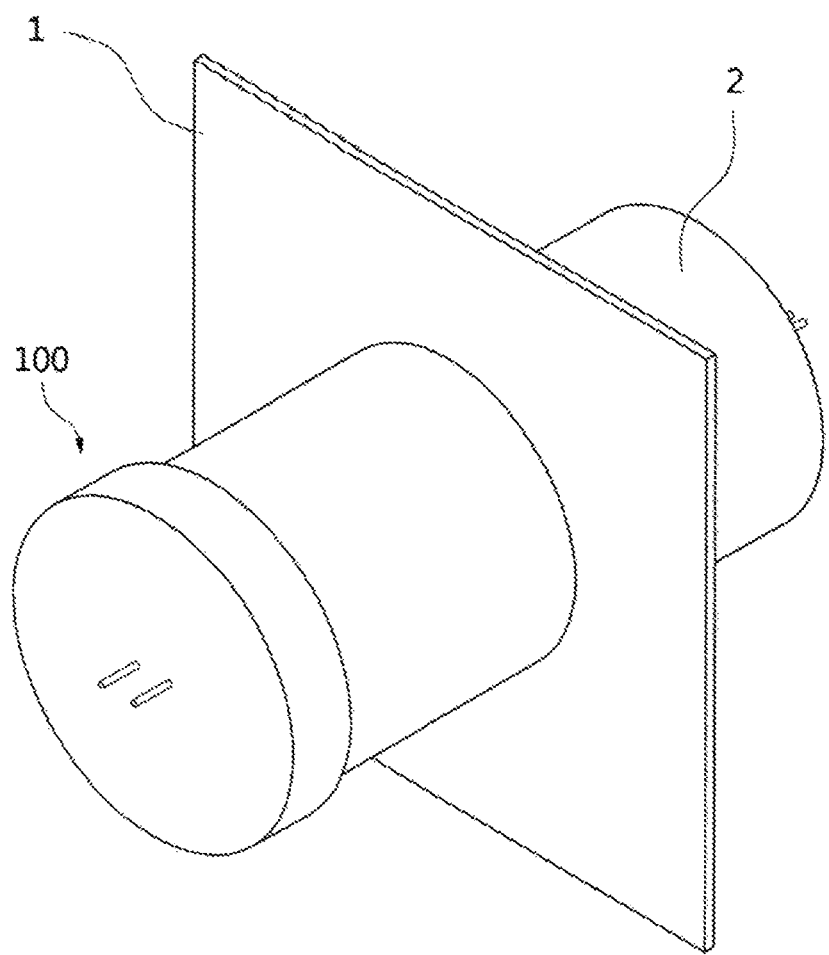
Figure 9:
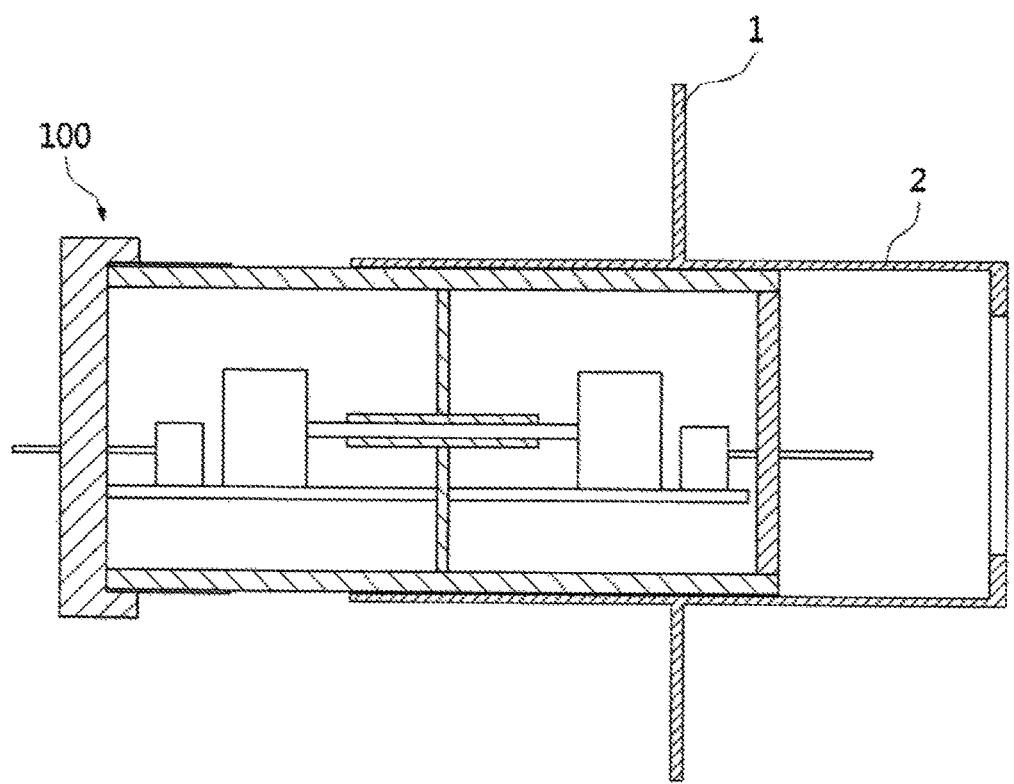

FIGS. 5 and 6 are diagrams showing the structure of an electromagnetic shielding wall and a penetrating waveguide on which the broadband surge suppression module having an optical coupling channel according to the embodiment of the present invention is installed. FIGS. 7 to 9 are diagrams showing a method for mounting the broadband surge suppression module having an optical coupling channel according to the embodiment of the present invention to the penetrating waveguide of FIGS. 5 and 6.

Referring to FIGS. 5 and 6, a penetrating waveguide 2, formed to penetrate through an electromagnetic shielding wall 1 for protecting a control system from outside the control system, may be located in a portion of the electromagnetic shielding wall 1. Further, as shown in FIGS. 7 to 9, a broadband surge suppression module 100 having an optical coupling channel may be inserted into and mounted to the penetrating waveguide 2 of the electromagnetic shielding wall 1. Alternatively, the broadband surge suppression module 100 may be detached from the penetrating waveguide 2.

Figure 10:
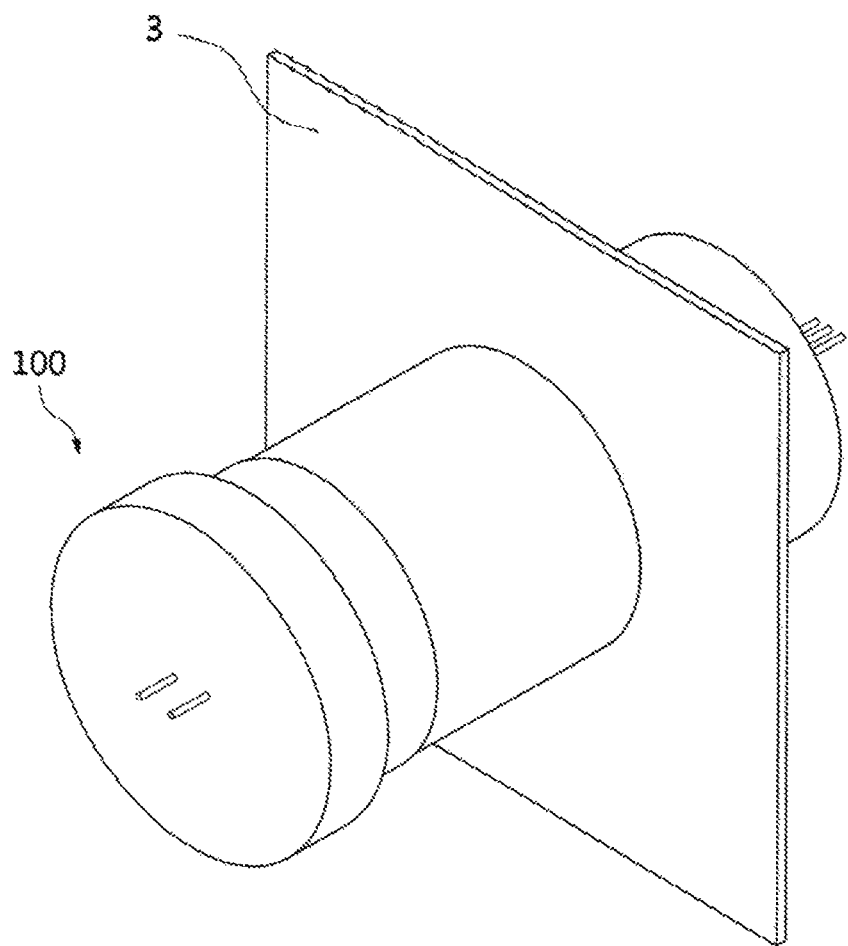
FIGS. 10 and 11 are diagrams showing a method for directly mounting the broadband surge suppression module having an optical coupling channel according to the embodiment of the present invention to the electromagnetic shielding wall.
Figure 11:
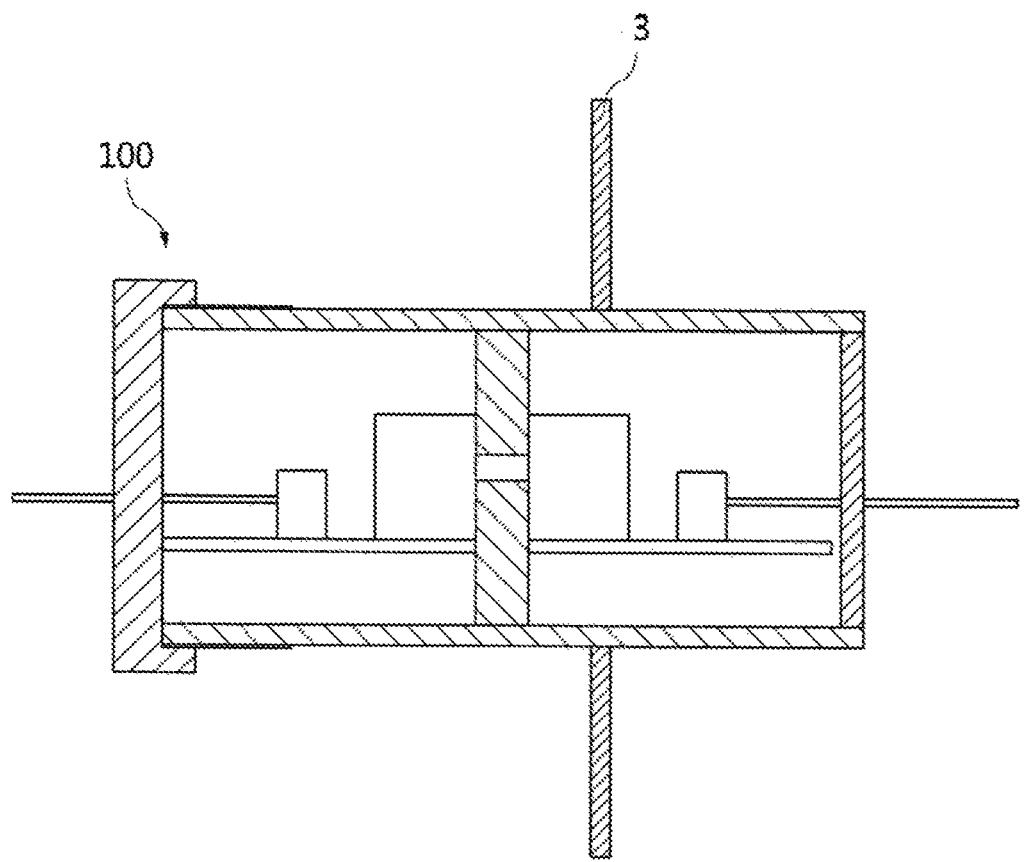

FIGS. 10 and 11 are diagrams showing a method for directly mounting the broadband surge suppression module having an optical coupling channel according to the embodiment of the present invention to the electromagnetic shielding wall.

Referring to FIGS. 10 and 11, an electromagnetic shielding wall 3 has a hole formed in a portion thereof, wherein the hole enables the mounting of the broadband surge suppression module 100 having an optical coupling channel, thus allowing the broadband surge suppression module 100 to be directly mounted to the electromagnetic shielding wall 3 through the hole.

Below, a method for categorizing the use purpose of the broadband surge suppression module having an optical coupling channel according to the embodiment of the present invention as input or output use will be described.

Figure 12:
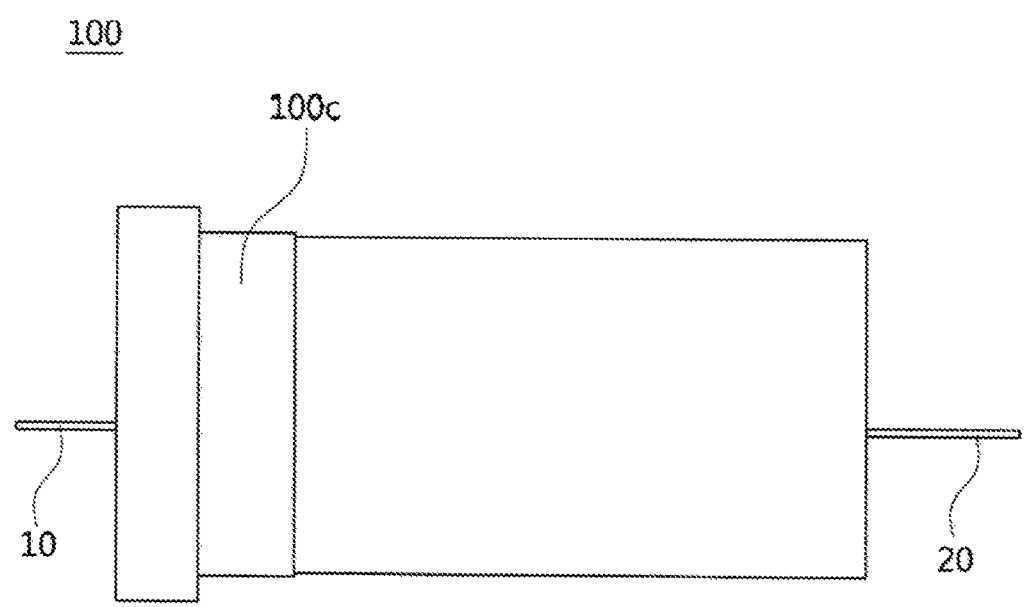
FIGS. 12 to 14 are diagrams showing the configuration of a broadband surge suppression module having an optical coupling channel, for input use, according to an embodiment of the present invention.
Figure 13:
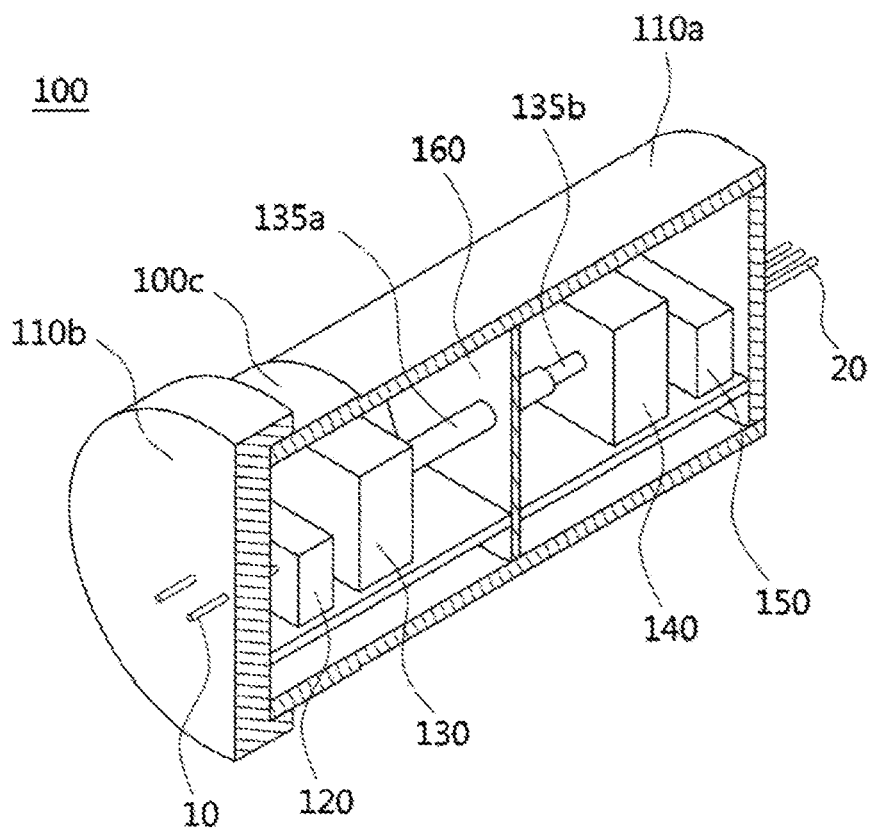
Figure 14:
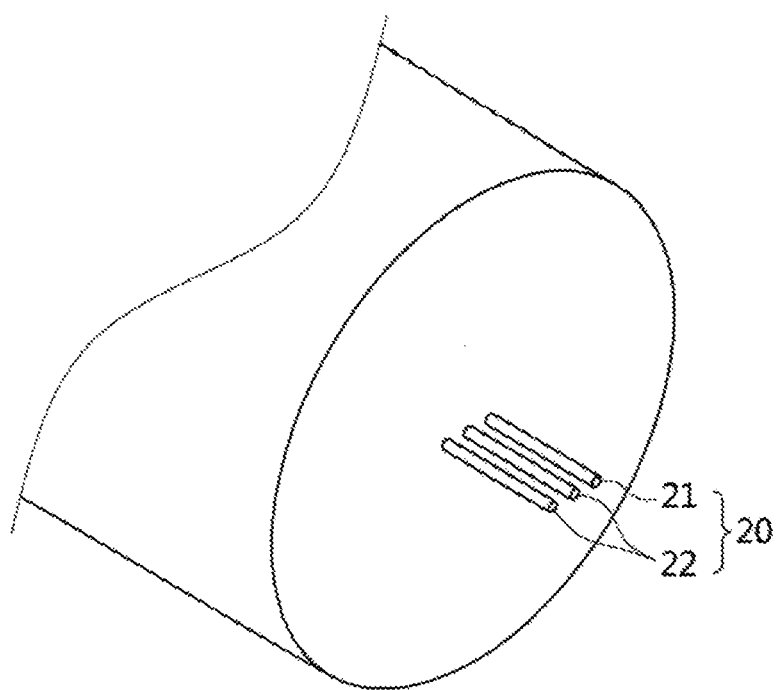
Figure 15:
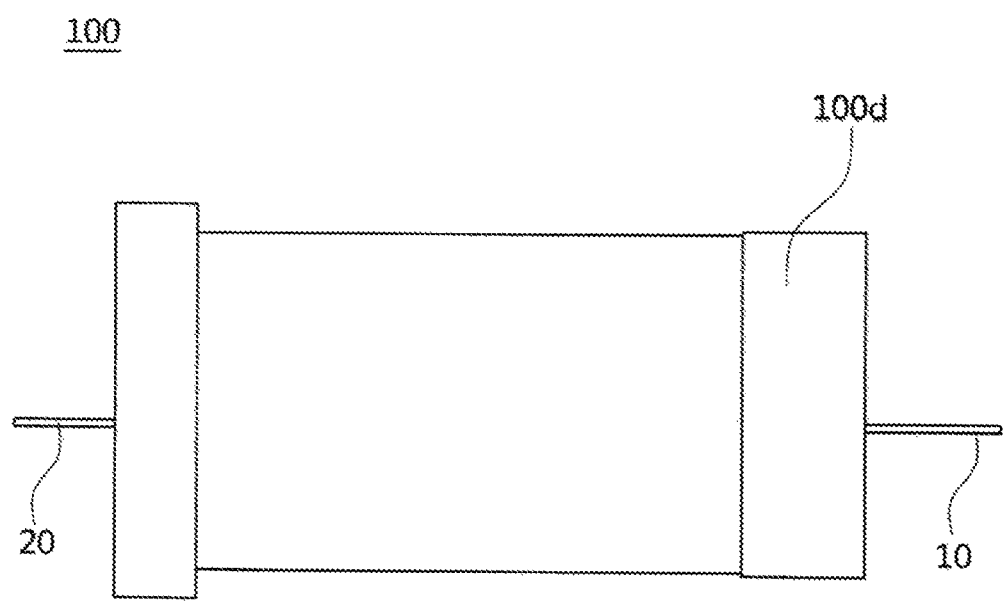
FIGS. 15 to 17 are diagrams showing the configuration of a broadband surge suppression module having an optical coupling channel, for output use, according to an embodiment of the present invention.
Figure 16:
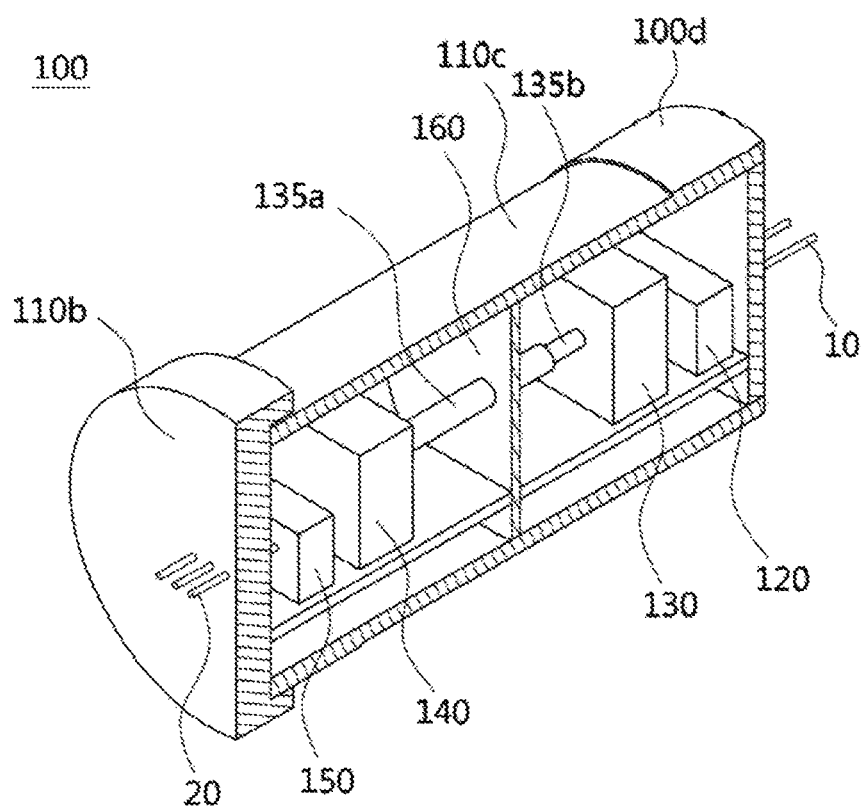
Figure 17:
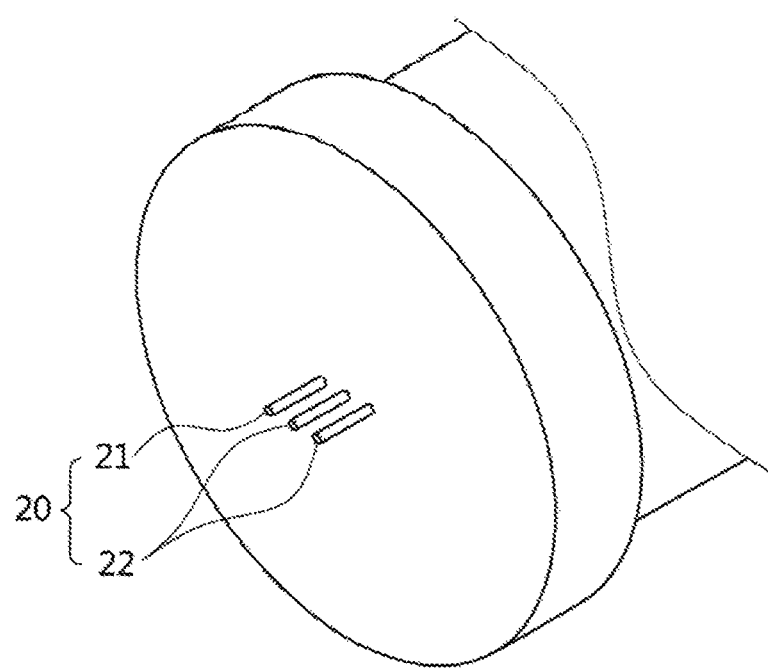

FIGS. 12 to 14 are diagrams showing the configuration of a broadband surge suppression module having an optical coupling channel, for input use, according to an embodiment of the present invention. FIGS. 15 to 17 are diagrams showing the configuration of a broadband surge suppression module having an optical coupling channel, for output use, according to an embodiment of the present invention. Although only drawings for the configuration of modules in which an optical cable is used as the optical coupling channel have been presented in FIGS. 12 to 17, a broadband surge suppression module in which no optical cable is used may also have the same configuration as the above modules. Further, in FIGS. 12 to 17, the same reference numerals are assigned to the same components as those of the broadband surge suppression module 100 having an optical coupling channel, which was shown in FIGS. 1 to 3, and a detailed description thereof will be omitted.

As shown in FIGS. 12 to 14 and FIGS. 15 to 17, the broadband surge suppression module 100 having an optical coupling channel according to the embodiment of the present invention may be designed to be categorized into a module for input use (FIGS. 12 to 14) and a module for output use (FIGS. 15 to 17). Here, since it may be difficult to categorize the use purpose of the broadband surge suppression module 100 using only the external shape thereof, an input use mark 100c may be additionally formed on an input stage when the module is intended for input use, and an output use mark 100d may be additionally formed on an output stage when the module is intended for output use. However, the position of this mark is not limited to any specific position. Further, in the case of input use, a DC feed line 21 and a digital signal line 22 may be formed on the output stage, as shown in FIG. 14. In the case of output use, a DC feed line 21 and a digital signal line 22 may be formed on the input stage, as shown in FIG. 17.

Below, a configuration in which a module housing including multiple broadband surge suppressors therein is installed on an electromagnetic shielding wall will be described. Here, each of the multiple surge suppressors may be any one of the broadband surge suppression module having an optical coupling channel, shown in FIGS. 1 to 17.

Figure 18:
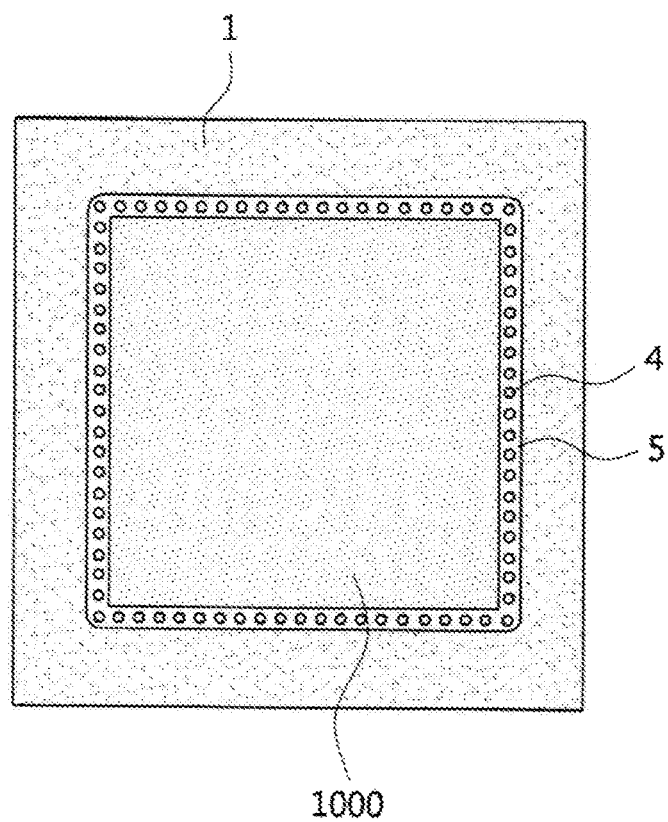
FIG. 18 is a diagram illustrating an example in which a module housing including multiple broadband surge suppression modules, each having an optical coupling channel, according to the embodiment of the present invention is installed on an electromagnetic shielding wall.
Figure 19:
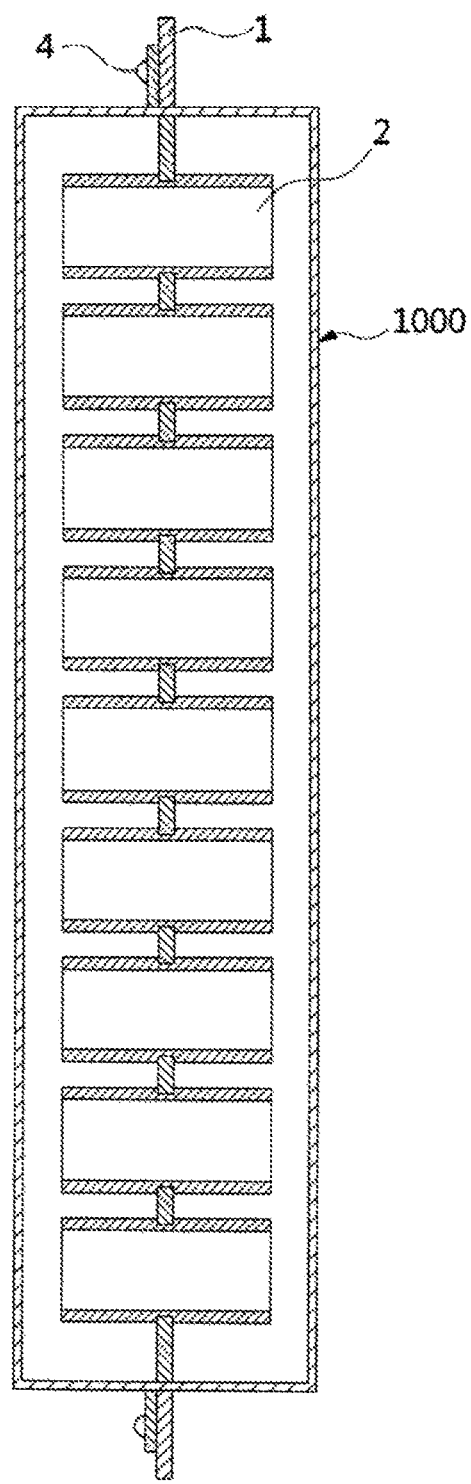
FIGS. 19 and 20 are internal sectional views showing the arrangement of the broadband surge suppression modules, each having an optical coupling channel, according to the embodiment of the present invention in the module housing.
Figure 20:
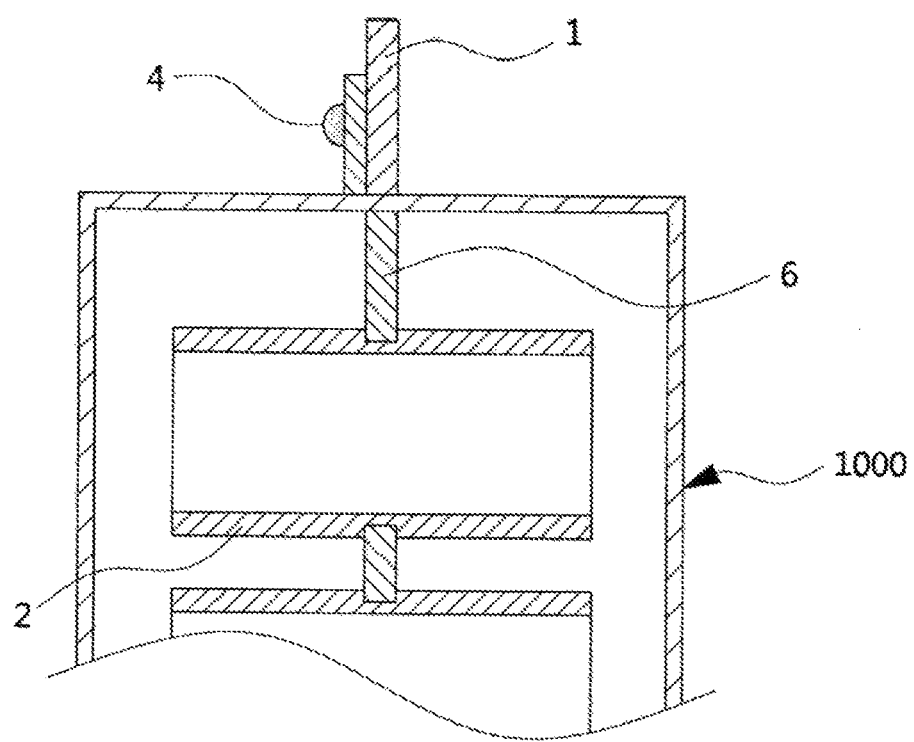

FIG. 18 is a diagram illustrating an example in which a module housing including multiple broadband surge suppression modules, each having an optical coupling channel, according to the embodiment of the present invention is installed on an electromagnetic shielding wall. FIGS. 19 and 20 are internal sectional views showing the arrangement of the broadband surge suppression modules, each having an optical coupling channel, according to the embodiment of the present invention in the module housing.

Since broadband surge suppression modules, each having an optical coupling channel, are assembled in a shape that penetrates through the electromagnetic shielding wall 1, it is required to form a hole and install a penetrating waveguide in the electromagnetic shielding wall 1, and the workload required for this operation increases in proportion to the number of modules to be installed. To solve this problem, referring to FIGS. 18 to 20, when multiple surge suppression modules are required to be installed, that is, when multiple digital lines must be connected to the inside of the electromagnetic shielding wall 1, a scheme for installing the surge suppression modules in a separate module housing 1000 and assembling the module housing 1000 to the electromagnetic shielding wall 1 may be used.

Referring to FIG. 18, an example is shown in which, to install multiple surge suppression modules, the multiple surge suppression modules are installed on the electromagnetic shielding wall 1 using the separate module housing 1000. In detail, an example in which a flange part 5 of the module housing 1000 and the electromagnetic shielding wall 1 are mounted to each other through a fastening part 4 such as bolts or welding parts is illustrated.

FIGS. 19 and 20 are views showing an example in which multiple surge suppression modules are installed in the module housing 1000. In the module housing 1000, multiple penetrating waveguides, which are mounted to the surge suppression modules, and a housing shielding wall 6, which can be located on an extension of the electromagnetic shielding wall 1, may be configured.

The module housing 1000 shown in FIGS. 18 to 20 may also provide a space required to install power lines and filters for other signal lines in addition to the surge suppression modules for digital lines according to the present invention.

In accordance with the present invention, a control system requiring the connection of a large number of conductive lines may be protected from high-power electromagnetic interference. More specifically, the present invention may prevent high-power surges from flowing into a control system through a digital signal line of the control system, which requires the connection of a conductive line, using an optical coupling channel.

Further, the present invention may enable a surge suppression module having a small size to be implemented because signals are transferred using an optical coupling channel rather than a filter circuit. By means of this, the present invention may reduce the space required to install multiple filters and may enable a larger number of transmission lines to be connected in the same space.

Furthermore, the present invention may very effectively suppress a broadband surge signal because signals are transferred through an optical coupling channel, after which the original signals are restored.

Furthermore, the present invention may be manufactured to be detachably mounted to a shielding wall, thus facilitating the maintenance of the present invention.

As described above, in the broadband surge suppression module having an optical coupling channel according to the present invention, the configurations and schemes in the above-described embodiments are not limitedly applied, and some or all of the above embodiments can be selectively combined and configured so that various modifications are possible.

What is claimed is:

1. A broadband surge suppression module having an optical coupling channel, comprising:
   a surge protection circuit unit for eliminating or limiting a surge signal from an input digital signal;
   a light-emitting circuit unit for receiving an output signal of the surge protection circuit unit, converting the output signal into an optical signal, and transmitting the optical signal;
   a light-receiving circuit unit for receiving the optical signal from the light-emitting circuit unit;
   a signal restoration circuit unit for restoring a digital signal from an output signal of the light-receiving circuit unit; and
   a module casing unit for allowing the surge protection circuit unit, the light-emitting circuit unit, the light-receiving circuit unit, and the signal restoration circuit unit to be located therein, the module casing unit being formed to penetrate through an electromagnetic shielding wall for protecting a control system.

2. The broadband surge suppression module of claim 1, wherein the module casing unit comprises an inner conductive partition unit formed between the light-emitting circuit unit and the light-receiving circuit unit.

3. The broadband surge suppression module of claim 2, wherein the optical signal transmitted from the light-emitting circuit unit is transferred to the light-receiving circuit unit through an optical cable that is located on a partition-penetrating waveguide formed to penetrate through the inner conductive partition unit.

4. The broadband surge suppression module of claim 2, wherein the optical signal transmitted from the light-emitting circuit unit is transferred to the light-receiving circuit unit through a partition hole formed through the inner conductive partition unit.

5. The broadband surge suppression module of claim 4, wherein the light-emitting circuit unit is formed to be in close contact with a first side of the inner conductive partition unit, and the light-receiving circuit unit is formed to be in close contact with a second side of the inner conductive partition unit.

6. The broadband surge suppression module of claim 2, wherein the inner conductive partition unit is formed to be located on an extension of the electromagnetic shielding wall, with the module casing unit mounted to the electromagnetic shielding wall.

7. The broadband surge suppression module of claim 1, wherein the module casing unit is formed to be detachably mounted to the electromagnetic shielding wall.

8. The broadband surge suppression module of claim 1, wherein the module casing unit is formed to be detachably mounted to a penetrating waveguide formed to penetrate through the electromagnetic shielding wall.

9. The broadband surge suppression module of claim 1, wherein the signal restoration circuit unit is supplied with DC power from a DC power source to restore a digital signal from the optical signal.

10. The broadband surge suppression module of claim 1, wherein the module casing unit is configured such that a mark is formed on a surface of an input stage or an output stage.

11. The broadband surge suppression module of claim 1, wherein the module casing unit is formed in a cylindrical shape.

12. A broadband surge suppression module having an optical coupling channel, comprising:
   a module casing unit located to penetrate through an electromagnetic shielding wall for protecting a control system;
   a surge protection circuit unit located in the module casing unit and configured to eliminate or limit a surge signal from an input signal;
   an optical coupling channel unit located in the module casing unit and configured to receive an output signal of the surge protection circuit unit and transmit the output signal from an input stage to an output stage of the module casing unit through an optical coupling channel; and a signal restoration circuit unit located in the module casing unit and configured to restore a digital signal from an output signal of the optical coupling channel unit.

13. The broadband surge suppression module of claim 12, wherein the optical coupling channel unit comprises:
a light-emitting circuit unit for receiving the output signal of the surge protection circuit unit, converting the output signal into an optical signal, and transmitting the optical signal; and
a light-receiving circuit unit for receiving the optical signal from the light-emitting circuit unit.

14. The broadband surge suppression module of claim 13, wherein the module casing unit comprises an inner conductive partition unit formed between the light-emitting circuit unit and the light-receiving circuit unit.

15. The broadband surge suppression module of claim 14, wherein the optical signal transmitted from the light-emitting circuit unit is transferred to the light-receiving circuit unit through an optical cable that is located on a partition-penetrating waveguide formed to penetrate through the inner conductive partition unit.

16. The broadband surge suppression module of claim 14, wherein the optical signal transmitted from the light-emitting circuit unit is transferred to the light-receiving circuit unit through a partition hole formed through the inner conductive partition unit.

17. The broadband surge suppression module of claim 13, wherein the module casing unit is formed to be detachably mounted to the electromagnetic shielding wall.

18. The broadband surge suppression module of claim 13, wherein the module casing unit is configured such that a mark is formed on a surface of the input stage or the output stage.

19. A broadband surge suppression module having an optical coupling channel, comprising:
a module housing configured to include multiple broadband surge suppressors therein and formed in a portion of an electromagnetic shielding wall for protecting a control system,
wherein each of the multiple broadband surge suppressors comprises:
a surge protection circuit unit for eliminating or limiting a surge signal from an input digital signal;
a light-emitting circuit unit for receiving an output signal of the surge protection circuit unit, converting the output signal into an optical signal, and transmitting the optical signal;
a light-receiving circuit unit for receiving the optical signal from the light-emitting circuit unit;
a signal restoration circuit unit for restoring a digital signal from an output signal of the light-receiving circuit unit; and
a module casing unit for allowing the surge protection circuit unit, the light-emitting circuit unit, the light-receiving circuit unit, and the signal restoration circuit unit to be located therein, the module casing unit being located to penetrate through a housing shielding wall in the module housing, which is located on an extension of the electromagnetic shielding wall.

20. The broadband surge suppression module of claim 19, wherein the module casing unit comprises an inner conductive partition unit formed between the light-emitting circuit unit and the light-receiving circuit unit.

* * * * *